United States Patent
Eckstein et al.

(10) Patent No.: US 11,508,537 B2
(45) Date of Patent: Nov. 22, 2022

(54) OPERATING DEVICE FOR A STEERING WHEEL OF A VEHICLE

(71) Applicant: ZF Friedrichshafen AG, Friedrichshafen (DE)

(72) Inventors: Lutz Eckstein, Aachen (DE); Jan Bavendiek, Roetgen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 396 days.

(21) Appl. No.: 16/622,827

(22) PCT Filed: May 18, 2018

(86) PCT No.: PCT/EP2018/063118
§ 371 (c)(1),
(2) Date: Dec. 13, 2019

(87) PCT Pub. No.: WO2018/233959
PCT Pub. Date: Dec. 27, 2018

(65) Prior Publication Data
US 2021/0146985 A1    May 20, 2021

(30) Foreign Application Priority Data
Jun. 20, 2017   (DE) ................... 10 2017 210 254.3

(51) Int. Cl.
*H01H 25/04*   (2006.01)
*B62D 1/04*   (2006.01)
(Continued)

(52) U.S. Cl.
CPC .......... *H01H 25/041* (2013.01); *B60K 37/06* (2013.01); *B62D 1/046* (2013.01); *G05G 1/02* (2013.01);
(Continued)

(58) Field of Classification Search
CPC .......... H01H 25/041; H01H 2025/048; H01H 3/125; H01H 13/705; H01H 13/14;
(Continued)

(56) References Cited

U.S. PATENT DOCUMENTS

| 6,399,904 B1 * | 6/2002 | Mimata ................. H01H 25/04 200/406 |
| 2003/0000763 A1 | 1/2003 | Colling et al. |

(Continued)

FOREIGN PATENT DOCUMENTS

| CN | 101290844 A | 10/2008 |
| DE | 10 2005 012 715 A1 | 5/2006 |

(Continued)

OTHER PUBLICATIONS

International Search Report for PCT/EP2018/063118, dated Sep. 11, 2018, 4 pgs.
(Continued)

*Primary Examiner* — Ahmed M Saeed
(74) *Attorney, Agent, or Firm* — Crowell & Moring LLP

(57) ABSTRACT

An operating device for a steering wheel comprises an operating element, which can be selectively rotated about a first rotation axis and a second rotation axis for controlling a control system by means of an actuation, wherein the operating element can be rotated to an actuation stage from a starting position, wherein the first rotation axis is coaxial to the longitudinal axis of the operating element, and the second rotation axis is substantially transverse to the first rotation axis, wherein a force application point has a mechanical advantage with respect to the second rotation axis when actuated about the second rotation axis, and wherein the force application point has no substantial mechanical advantage in relation to the second rotation axis when the operating element is actuated about the first (Continued)

rotation axis, in order to prevent a simultaneous actuation of the operating element about the first and second rotation axes.

13 Claims, 1 Drawing Sheet

(51) Int. Cl.
  *G05G 1/02* (2006.01)
  *B60K 37/06* (2006.01)
(52) U.S. Cl.
  CPC .. *B60K 2370/133* (2019.05); *B60K 2370/135* (2019.05); *B60K 2370/137* (2019.05); *B60K 2370/1438* (2019.05); *B60K 2370/782* (2019.05); *H01H 2025/048* (2013.01)
(58) Field of Classification Search
  CPC ........ H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; B60K 37/06; B60K 2370/133; B60K 2370/135; B60K 2370/137; B60K 2370/1438; B60K 2370/782; B60K 35/00; B62D 1/046; G05G 1/02; G05G 5/06; G05G 1/06
  See application file for complete search history.

(56) References Cited

U.S. PATENT DOCUMENTS

| | | |
|---|---|---|
| 2004/0046751 A1 | 3/2004 | Heimermann et al. |
| 2006/0071489 A1 | 4/2006 | Bricaud et al. |
| 2006/0155441 A1 | 7/2006 | Berg et al. |
| 2010/0326229 A1 | 12/2010 | Gerharz et al. |
| 2020/0133408 A1* | 4/2020 | Esnault ................... G06F 3/041 |

FOREIGN PATENT DOCUMENTS

| | | |
|---|---|---|
| DE | 10 2007 022 526 A1 | 11/2008 |
| DE | 10 2008 056 974 A1 | 5/2010 |
| EP | 0712062 A1 | 5/1996 |
| TW | 354 849 B | 3/1999 |
| WO | WO 2016079986 A1 | 5/2016 |

OTHER PUBLICATIONS

Office Action for German Patent App. No. DE 10 217 210 254.3, dated May 18, 2018, 12 pgs.

Office Action and First Search for Chinese Application No. 201880041031.8, dated Jun. 6, 2022, and May 27, 2022, respectively (with English Translations) (17 pages).

\* cited by examiner

OPERATING DEVICE FOR A STEERING WHEEL OF A VEHICLE

RELATED APPLICATIONS

This application is a filing under 35 U.S.C. § 371 of International Patent Application PCT/EP2018/063118, filed May 18, 2018, claiming priority to German Patent Application 10 2017 210 254.3, filed Jun. 20, 2017. All applications listed in this paragraph are hereby incorporated by reference in their entireties.

TECHNICAL FIELD

The invention relates to an operating device for a steering wheel of a vehicle. The Invention also relates to a steering wheel for a vehicle that has such an operating device.

BACKGROUND

By way of example, a steering wheel for a vehicle that has operating elements for controlling at least one control system for regulating the longitudinal dynamics of the vehicle is described in DE 10 2008 056 974 A1. The operating elements comprise an adjustment element for altering a speed setting value in the at least one control system for the longitudinal dynamics. The adjustment element can be actuated in two opposing actuation directions, in order to specify a direction of the change in the speed setting value through the actuation direction, and which can be actuated in at least two stages with regard to the extent of the actuation in each of the two actuation directions. An extent of the change in the speed setting value is defined by the extent of the actuation.

SUMMARY

The object of the present invention is to further develop an operating device of the type described above, and to increase the operating safety and operating convenience. The object is achieved by the subject matter disclosed herein. Preferred embodiments can also be derived from the present disclosure.

An operating device according to the invention for a steering wheel in a vehicle comprises an operating element, which can be rotated selectively about a first rotation axis or a second rotation axis in order to control at least one control system by means of an actuation action that takes place at a force application point. The operating element can also be rotated from a starting position to at least one actuation stage, wherein the first rotation axis is coaxial to the longitudinal axis of the operating element, and the second rotation axis is substantially transverse to the first rotation axis. The force application point has a mechanical advantage in relation to the second rotation axis when actuating the operating element about the second rotation axis. The force application point has no substantial mechanical advantage in relation to the second rotation axis when actuating the operating element about the first rotation axis, in order to prevent simultaneous actuation of the operating element about the first and second rotation axes.

The operating element is preferably at least partially accommodated in the steering wheel, and is used for controlling at least one control system, wherein numerous control systems can also be control with the operating device. A control system is preferably understood to be an assistance and convenience system for the vehicle, which is intended to simplify and/or make the driving experience more pleasant for the driver of the vehicle. In particular, the driver is supported by the assistance and convenience system when driving the vehicle. These types of assistance and convenience systems can comprise a cruise control or a distance regulating system, which can be activated, deactivated, and/or controlled by means of the operating device. An audio system, for example, can also be controlled by means of the operating device in order to output audio data, or entries in a list in a selection menu can be examined or selected.

The operating element in the operating device is intended in particular for outputting a control command for at least one of the aforementioned control systems. The operating element is understood to be a combined rotating and push button operating element. The operating element preferably has two operating functions in this case. As a result, one or more control commands to the control system can be issued through a rotating of the operating element about the first rotation axis. Furthermore, by rotating or tilting the operating element about a second rotation axis, one or more other control commands can also be issued to the control system. Due to the design of the operating element, the operating element can either be rotated about the first rotation axis or about the second rotation axis. At the same time, a simultaneous actuation is prevented.

When the operating element is actuated about the first rotation axis, the operating element can be rotated in a first and second direction through the application of an actuation force at the force application point. Alternatively or additionally, the operating element can be tilted in a first and second direction through the application of an actuation force at the force application point. The actuating force is applied to the operating element by the driver or the user of the vehicle. The force application point is understood to be the point on the operating element at which the user actuates the operating element by means of an actuation force. The actuation of the operating element can take place at an arbitrary point on the operating element. Preferably, the actuation of the operating element can take place in the region of a web.

In the following, it shall be assumed for purposes of illustration that there is one respective force application point for actuating the operating element about the first rotation axis, and one respective force application point for actuating the operating element about the second rotation axis. The first rotation axis of the operating element is preferably horizontal. The longitudinal axis is an axis that divides the operating element in the middle. In other words, the longitudinal axis describes the center axis of the operating element, about which the operating element can rotate. The first and second movement directions of the operating element preferably run vertically upward or downward for adjusting the operating element to at least one actuation stage. The operating element preferably has at least two actuation stages for each movement direction. As a matter of course, the operating element can also have three actuation stages, or four or more actuation stages. Each actuation stage can have different functions for controlling the respective control system.

The operating element in the operating device can also rotate in a third direction about the second rotation axis, wherein the third direction is preferably perpendicular to the operating element. Alternatively or additionally, the operating element can be tilted in the third direction. In other words, the second rotation axis is such that the movement element tilts about the second rotation axis. The second rotation axis is also preferably orthogonal to the first rotation axis. A switch or button, for example, is actuated via the actuation of the operating element in the third direction, in order to activate or deactivate a control system, e.g. a cruise control or a distance regulating system.

This third direction of movement can have numerous stages, like the first and second directions of movement. This means that the operating element can have two or more actuation stages for the third direction of movement. In this case, the operating element can be configured such that it exhibits a noticeable resistance to overcoming the respective actuation stage in the third direction of movement. If a click-switch is used for the third direction of movement, the operating element can click into an activated, pushed inward position.

As a result of such a design for the operating device and the arrangement of the two rotation axes in relation to one another, the operating element can be actuated separately in any of three different directions, without an unintentional simultaneous actuation of the operating element in the other two directions. This allows for a combination of numerous functions within the operating element and increases the operating safety and the operating convenience of the operating device.

A cruise control for the vehicle is operated with the operating device in a preferred exemplary embodiment. As a result, a speed setting for the vehicle can be increased or decreased, by 1 km/h for example, in a first actuation stage, by moving the operating element in the first or second direction. In the second actuation stage of the first or second direction of movement, the speed setting can be increased or decreased by 5 km/h, for example. In the third actuation stage, the speed setting can be increased or decreased by 10 km/h, for example. The cruise control can be activated or deactivated, for example, by activating the operating element in the third direction.

Alternatively, the control system can comprise a distance regulating system. In this case, a distance to a forward vehicle can be set incrementally through actuating the operating element about the first rotation axis, for example, wherein the distance is increased or decreased in increments or one, five, or ten meters, depending on the actuation stage of the operating element. The distance regulating system can be activated or deactivated, for example, when the operating element is actuated in the third direction.

Moreover, the control system can be a control system that is not relevant to driving, e.g. with which an on-board computer or an audio system in the vehicle can be controlled. List entries can be examined by actuating the operating element in the first and second directions, and selected or deselected by actuating the operating element about the second rotation axis. One or more list entries can likewise be simultaneously examined, depending on the actuation stage.

Each actuation stage of the operating element preferably has a stop resistance for each direction of movement, which must be overcome in order to reach the next actuation stage. The user is provided with a haptic feedback via the resistance as soon as it is moved to the next actuation stage. This increases the operating safety of the operating device and reduces or prevents faulty actuation, because the user receives direct haptic feedback regarding the selected actuation stage through the sense of touch. The operation of the operating device is thus more intuitive and pleasant for the user.

It is also preferred that the operating element can be automatically returned to the starting position after the actuation. The operating element is spring loaded for this, wherein the operating element is moved back to the starting position by the spring force after completion of the actuation.

The respective actuation stages of the operating element can be actuated briefly, or maintained for an arbitrary length of time. A short actuation is to be understood to be a point in time in which the control command is executed for the control system. By way of example, with a cruise control, the speed of the vehicle is increased or decreased by 1, 5 or 10 km/h, depending on the actuation stage. Furthermore, the respective actuation stage can be actuated for an arbitrary length of time. This means that the corresponding control command for the control system is executed for a longer period of time in the respective actuation stage, or the corresponding control command is repeated in the defined time intervals until the actuation action has been completed. By way of example, with cruise control, the driving speed is increased or decreased in increments of one, five or ten, depending on the actuation stage, until the actuation action has been completed, and the operating element is automatically returned to the starting position. The operating element is thus designed as a rocker switch, which rocks in one direction as a result of the actuation, and returns to the starting position in the other direction after completion of the actuation.

The operating element preferably has a substantially cylindrical section and a substantially conical section, wherein the cylindrical section is for actuating the operating element about the first rotation axis, and the conical section is for actuating the operating element about the second rotation axis. The two sections are preferably axially adjacent to one another. The actuation of the operating element in the first or second direction takes place via the cylindrical section, wherein the operating element is rotated about the first rotation axis. The actuation of the operating element in the third direction takes place via the conical section, wherein the operating element is tilted over the second rotation axis.

The invention includes the technical teaching that a web is formed on the circumference of the cylindrical section for rotating the operating element about the first rotation axis. There is preferably also an operating surface for tilting and/or rotating the operating element about the second rotation axis on the circumference of the conical section, wherein the operating surface has a depression that can be felt. The cylindrical section, and the web extend over approximately one half to two thirds of the horizontal length of the operating element, starting from that end surface of the operating element that is closest to the second rotation axis. The second rotation axis is preferably located between the quarter point and the one third point on the longitudinal axis of the operating element. The second rotation axis can preferably form a center perpendicular to the web, or cylindrical section, respectively, and thus runs substantially orthogonal to the first rotation axis. The second rotation axis can however be formed at an angle to the first rotation axis, depending on the design of the operating element. The web makes it easier to selectively actuate the operating element in the first and second directions. The web also prevents the operating element from jumping back during the actuation of the operating element.

The web on the cylindrical section is preferably connected to the operating surface of the conical section. The web widens in the manner of a triangle in the transition region to the operating surface to the end surface of the operating element. The web can also or alternatively be flattened in the region of the triangular operating surface. The depression, or recess, is preferably formed on the outer region of the operating surface in order to additionally prevent a faulty actuation of the operating element. As a result, the depression can be felt haptically and the operating element can thus be actuated in the third direction, without having to look directly at the operating device. The connection between the web and the operating surface also allows for an intuitive guidance of the finger, for example, with which the operating device can be actuated by the user.

The operating device may be located in the peripheral field of vision of the user or driver, but it is not necessary to look directly at the operating device due to the design of the operating system. As a result, an intuitive operation of the operating device can take place through a haptic identification of the geometric shape of the operating element.

The force application point for the actuation of the operating element about the first rotation axis is preferably located axially in the middle of the web. In other words, the actuation of the operating element in the first or second direction takes place substantially at half the length of the web and vertically. The force application point for the actuation of the operating element in the third direction is preferably located in the center of the operating surface, wherein the actuation of the operating element in the third direction takes place substantially vertically to the operating surface. The distance from the force application point, i.e. the point where force is applied to the operating element, to the second rotation axis is defined as a mechanical advantage. If the mechanical advantage is larger, i.e. the actuation of the operating element takes place further away from the second rotation axis, the operating element can be actuated more easily in the third direction. If the force application point at which the user actuates the operating element in the third direction is closer to the second rotation axis, it is more difficult for the user to actuate the operating element in the third direction, wherein the difference in force is not great. This is particularly advantageous for preventing a faulty actuation of the operating element.

The force application points for actuating the operating element about the first rotation axis and second rotation axis are preferably in the same plane. This means that when actuating the operating element about the first rotation axis, the operating element can be rotated in the first or second direction, wherein there is no, or only a negligibly small, mechanical advantage for actuating the operating element about the second rotation axis in the third direction. In other words, no, or only a negligibly small, mechanical advantage means that an actuation of the operating element about the second rotation axis is prevented.

The operating surface for the third direction of movement is triangular, and relatively flat compared to the conical section, such that relatively large pressure surface is formed in relation to the size of the operating element, which prevents a simultaneous rotating of the operating element about the first rotation axis when actuating the operating element about the second rotation axis. As a result, an actuation of the operating element takes place about either the first or second direction, or an actuation of the operating element takes place in the third direction.

According to a preferred embodiment, the operating device also has a ring element for controlling other control systems. As a result, a distance regulating system can be combined with a cruise control. It is also conceivable to combine other aforementioned control systems with one another, wherein all of the control systems are controlled by means of the operating device according to the invention. The ring element thus expands the operating device and is understood to be a further operating element. The ring element can also be comprised of numerous segments, or designed as a ring wheel or touch element, and also comprise integrated push buttons. A touch element forms an input element in the manner of a touchscreen. Alternatively, the ring element and the operating element can also be adjacently or eccentrically located in relation to one another.

The ring element preferably comprises at least one push button, preferably four push buttons for controlling a control system. The push buttons on the ring element can be distributed evenly or unevenly about the operating element. The push buttons can also be used, for example, for examining list entries or for selecting such list entries. Moreover, the push buttons can be used for inputting control commands or activating or deactivating one or more control systems.

The push buttons preferably also have different sizes. According to a preferred exemplary embodiment, the operating element is located in the middle of the ring element, wherein the ring element has four push buttons. The four push buttons preferably have two different sizes. The larger push buttons are located vertically above and below the operating element. Accordingly, the smaller push buttons are located horizontally on both sides of the operating element, wherein the four push buttons form a ring, and the operating element is located in the middle of the ring.

According to an alternative embodiment, the operating element can be in the form of a roller that can rotate about the longitudinal axis. In this case, the operating element does not have a web in the first cylindrical section. Instead of a conical section with an operating surface and a depression, a second cylindrical section is formed in the region of the operating surface, wherein the diameter of the second cylindrical section is different than the diameter of the first cylindrical section. After an actuation, the operating element is not returned to a starting position, but instead can be rotated continuously in both directions to set an actuation stage.

Moreover, actuation in the third direction can be executed such that the operating element clicks into an actuation stage through the actuation, and is only released by a further actuation of the operating element. This is particularly ideal for activating or deactivating control systems, for example.

The invention also relates to a steering wheel for a vehicle that comprises an operating device according to the invention. The operating device is preferably located on a spoke in the steering wheel, and at least partially accommodated in the steering wheel.

In particular, the operating device according to the invention is used in a steering wheel for a motor vehicle. A motor vehicle is understood to be a vehicle that serves to transport people or goods, depending on its design and its special devices permanently connected to the vehicle. By way of example, a passenger car or a truck is understood to be a motor vehicle.

BRIEF DESCRIPTION OF THE DRAWINGS

Exemplary embodiments of the invention shall be explained in greater detail below in reference to the three figures. Therein.

DETAILED DESCRIPTION

Figure 1:
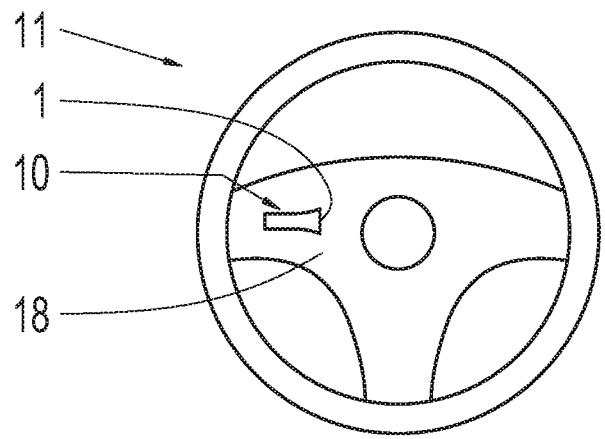
FIG. 1 shows a simplified view of a steering wheel for a vehicle that has an operating device according to the invention according to a first exemplary embodiment.

According to FIG. 1, a steering wheel 11 for a vehicle—not shown here—comprises an operating device 10 according to the invention that has an operating element 1 according to a first exemplary embodiment. The operating element 1 is accommodated on a spoke 18 in the steering wheel 11 in the present case, and can be actuated by a driver of the vehicle. Alternatively, the operating device 10 can be located in another region of the steering wheel 11.

Figure 2:
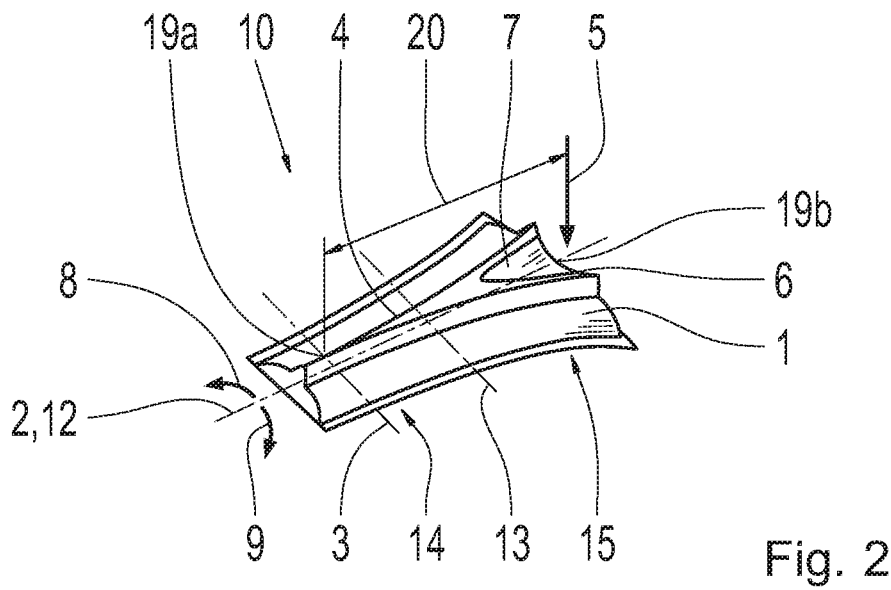
FIG. 2 shows a perspective view of an operating element in the operating device according to the invention shown in FIG. 1.

According to FIG. 2, the operating element 1 in the operating device 10 is intended for controlling a control system, wherein the operating element 1 can be selectively rotated about a first rotation axis 2 and a second rotation axis 3 by means of an actuation action at a respective force application point 19a, 19b. This means that the operating element 1 can be rotated either about the first rotation axis 2 or the second rotation axis 3. The operating element 1 can also be rotated from a starting position to three respective actuation stages. After completion of the actuation action, the operating element 1 is automatically returned to the starting position. The setting of the respective actuation stage can take place counter to a spring tension, for example. The first rotation axis 2 is coaxial to the longitudinal axis 12 of the operating element 1, and the second rotation axis 3 is presently orthogonal to the first rotation axis 2. The longitudinal axis 12, or the first rotation axis 2, respectively, corresponds to the axis of symmetry for the operating element 1, wherein the second rotation axis 3 is parallel to a transverse axis 13 of the operating element 1. The transverse axis 13 divides the operating element 1 at the longitudinal side into two parts of the same width. The second force application point 19b has a mechanical advantage in relation to the second rotation axis 3 when the operating element 1 is actuated about the second rotation axis 3. The first force application point 19a does not have a mechanical advantage 20 in relation to the second rotation axis 3 when the operating element 1 is actuated about the first rotation axis 2, in order to prevent a simultaneous actuation of the operating element 1 about the first and second rotation axes 2, 3. As a result, a simultaneous rotation of the operating element 1 about the first and second rotation axes 2, 3 is prevented, wherein a faulty actuation of the operating element 1 is prevented. The operating element 1 has a substantially cylindrical section 14 and a substantially conical section 15. The cylindrical section 14 is for rotating the operating element 1 about the first rotation axis 2, and the conical section 15 is for rotating the operating element 1 about the second rotation axis 3.

Furthermore, a web 4 is formed on the circumference of the cylindrical section 14 for rotating the operating element 1 about the first rotation axis 2. The actuation of the operating element 1 about the first rotation axis 2 in a first and second direction 8, 9 takes place via the web 4, wherein the web 4 ensures a reliable actuation of the operating element 1 in the first and second directions 8, 9 as a result of its shape. The web 4 is triangular for a haptic identification thereof, wherein the web 4 converges at a radial point.

An operating surface 6 is also formed on the circumference of the conical section 15 for rotating the operating element 1 about the second rotation axis 3. The actuation of the operating element 1 in a third direction 5 takes place via the operating surface 6. The operating surface 6 is flat, wherein a depression 7 is formed on the operating surface 6 for a haptic perception thereof. The shape of the operating surface 6 ensures that an unintended rotation of the operating element 1 about the first rotation axis 2 cannot take place. The web 4 on the cylindrical section 14 is connected to the operating surface 6 of the conical section 15 for an intuitive guidance, wherein the operating surface 6 converges in the shape of a triangle, and opens into the web 4.

Figure 3:
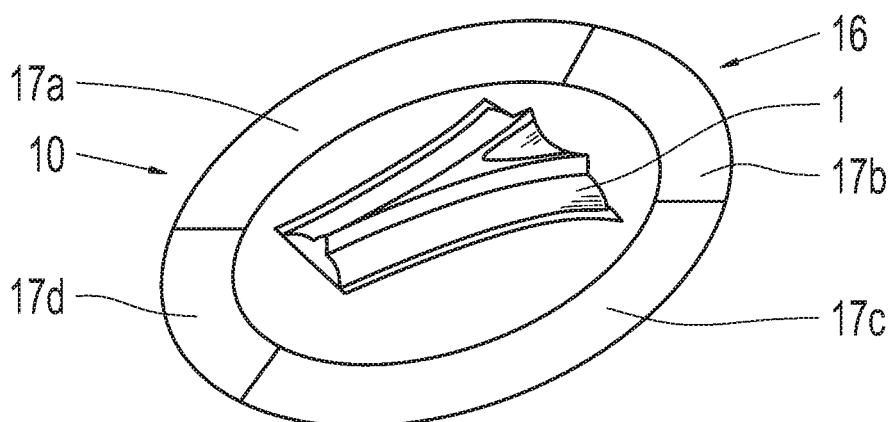
FIG. 3 shows a perspective view of the operating device according to the invention, according to a second exemplary embodiment.

FIG. 3 shows a second embodiment of the operating device 10 according to the invention. According to the second embodiment, the operating device 10 also has an additional ring element 16, in comparison with the operating device 10 according to the first embodiment, for controlling other control systems. The operating element 1 is located in the middle of the ring element 16. In the present case, the ring element 16 has a first, second, third, and fourth push button 17a, 17b, 17c, 17d, for controlling a control system. As a result, two or more control systems can be linked to one another, and controlled by the operating device 10. The four push buttons 17a, 17b, 17c, 17d are adjacent to one another, and have different sizes, wherein in the present case, each of the respective pairs of opposing push buttons 17a, 17c, and 17b, 17d are the same size. The two opposing push buttons 17a, 17c located on the longitudinal side of the operating element 1 are larger than the two opposing push buttons 17b, 17d located on the shorter transverse side of the operating element 1 with respect to the operating element 1.

The examples shown herein are selected merely by way of example. The web, for example, does not have to be triangular for haptic identification thereof. By way of example, the four push buttons can all be the same size. As a matter of course, there can also be more than four push buttons.

REFERENCE SYMBOLS 1 operating element
2 first rotation axis
3 second rotation axis
4 web
5 first direction of movement
6 operating surface
7 depression
8 second direction of movement
9 third direction of movement
10 operating device
11 steering wheel
12 longitudinal axis
13 transverse axis
14 cylindrical section
15 conical section
16 ring element
17a first push button
17b second push button
17c third push button
17d fourth push button
18 spoke
19a first force application point
19b second force application point
20 mechanical advantage

The invention claimed is:

1. An operating device for a steering wheel in a vehicle, comprising:
an operating element configured to be selectively rotated about a first rotation axis and a second rotation axis, the operating element configured to provide an input command to at least one control system in response to an actuation action that takes place at a force application point on the operating element, wherein:
the operating element is configured to be rotated to at least one actuation stage from a starting position;
the first rotation axis is coaxial to a longitudinal axis of the operating element, and the second rotation axis is substantially transverse to the first rotation axis;
the operating element is configured such that the force application point has a mechanical advantage with respect to the second rotation axis when the operating element is actuated about the second rotation axis;
the operating element is configured such that the force application point has no substantial mechanical advantage with respect to the second rotation axis when the operating element is actuated about the first rotation axis, in order to prevent a simultaneous actuation of the operating element about the first and second rotation axes; and
the operating element comprises a substantially cylindrical section and a substantially conical section, wherein the cylindrical section is configured for rotating the operating element about the first rotation axis and the conical section is configured for rotating the operating element about the second rotation axis.

2. The operating device according to claim 1, wherein the operating element further comprises a web formed on a circumference of the cylindrical section configured for rotating the operating element about the first rotation axis.

3. The operating device according to claim 1, wherein the operating element further comprises an operating surface formed on a circumference of the conical section configured for rotating the operating element about the second rotation axis, wherein the operating surface has a depression for facilitating haptic perception thereof.

4. The operating device according to claim 3, wherein the operating element further comprises a web formed on a circumference of the cylindrical section configured for rotating the operating element about the first rotation axis, wherein the web is connected to the operating surface of the conical section.

5. The operating device according to claim 1, wherein the operating element is configured to be rotated to at least two actuation stages from the starting position when rotated in the same direction.

6. The operating device according to claim 1, wherein the operating element is configured to automatically return to the starting position after at least one of being rotated to the at least one actuation stage or being actuated about the second rotation axis.

7. The operating device according to claim 1, further comprising:
a ring element configured to provide another input command to at least one control system.

8. The operating device according to claim 7, wherein the ring element comprises at least one push button.

9. The operating device according to claim 7, wherein the ring element comprises at least four push buttons.

10. The operating device according to claim 7, wherein the ring element comprises a touchscreen element.

11. The operating device according to claim 9, wherein at least two of the at least four push buttons are of different sizes.

12. A steering wheel for a vehicle, comprising the operating device according to claim 1.

13. The operating device according to claim 1, wherein the operating element is configured to be actuated about the second rotation axis to at least two actuation stages from the starting position when actuated in the same direction.

* * * * *